UNITED STATES PATENT OFFICE.

FLOYD W. ROBISON, OF DETROIT, MICHIGAN, ASSIGNOR TO UTILITY COMPRESSOR COMPANY, OF DETROIT, MICHIGAN, A CORPORATION OF MICHIGAN.

METHOD OF USE OF SULPHUR DIOXIDE IN ARTIFICIAL REFRIGERATING SYSTEMS.

1,406,582.   Specification of Letters Patent.   Patented Feb. 14, 1922.

No Drawing.   Application filed April 3, 1919. Serial No. 287,376.

*To all whom it may concern:*

Be it known that I. FLOYD W. ROBISON, a citizen of the United States, residing at Detroit, county of Wayne, State of Michigan, have invented a certain new and useful Improvement in Methods of Use of Sulphur Dioxide in Artificial Refrigerating Systems, and declare the following to be a full, clear, and exact description of the same, such as will enable others skilled in the art to which it pertains to make and use the same.

This invention relates to refrigerating mediums and method of preventing deleterious effects from the use of sulphur dioxide as a refrigerant in artificial refrigerating systems. The primary object of the invention is to provide a non-oxidizing refrigerant liquefying under low pressures at normal temperature. Particularly the object of the invention is to provide a refrigerant, the major volume of which consists of sulphur dioxide, and the use therewith of a non-oxidizing agent and a method of charging the system with such refrigerant in a manner to prevent or counteract any oxidizing effect.

Sulphur dioxide ($SO_2$) is commonly used as a refrigerant in artificial refrigerating systems and the principal objection to its use resides in the fact that it is an active oxidizing agent necessitating frequent cleaning of the metal parts of the circulating system which become rusted, clogging the valves and operative parts of the pump used in the compression of the fluid and further resulting in the development of sulphuric acid from moisture and air that may be resident or be introduced into the circulating system. The value derived from its use resides in the fact that it is reducible to a fluid state under low pressures at normal temperature and hence is admirably adapted for use in artificial refrigerating plants of small capacity such as are adapted for household use, etc.

Carbon dioxide ($CO_2$) is also used as a refrigerant and the principal objection to its use, particularly in small plants resides in the necessity of the high pressures (practically 1500 lbs. per square inch) required to liquefy the same. It is therefore entirely impracticable to take advantage of this gas in small refrigerating plants, although no deleterious effect is produced in its use as it has a non-oxidizing effect at or below normal temperatures.

I have discovered that sulphur dioxide may be utilized as a refrigerant without deleterious effects from oxidation by combining with the sulphur dioxide a small quantity of carbon dioxide, thus taking advantage of the quality of the carbon dioxide as a non-oxidizing agent to counteract the oxidizing effect of the sulphur dioxide. While I am aware that carbon dioxide has been utilized as a refrigerant, this quality of the gas is not depended upon in this instance but is utilized solely by reason of its quality as a non-oxidizing agent, and the quantity of carbon dioxide utilized may be less than ten per cent. of the volume of the refrigerant and secure the desired result without materially increasing the pressure at which the fluid liquefies.

There are several ways in which the circulating system may be charged and secure the necessary desired and beneficial result as above outlined. First, the circulating system may be initially charged with sulphur dioxide and a small volume of carbon dioxide below that which would materially increase the pressure at which the fluid would liquefy at normal temperature.

Secondly, the preferred method of charging the system (which has been found most effective in practice) is to first thoroughly dry the various parts of the system through which the fluid circulates and then wash the system with carbon dioxide to free it of any atmospheric air that may remain therein and to absorb the moisture. The method of washing the system is to charge the same with carbon dioxide to about fifty pounds pressure and then to exhaust the same and to repeat the charging and exhausting for a number of times to absolutely insure thorough cleansing and thereupon the system may be charged with the sulphur dioxide to the pressure required which is usually about thirty-five pounds per square inch gauge pressure. The quantity of carbon dioxide naturally remaining in the system after the period of washing mentioned, is ordinarily sufficient for the purpose of preventing an oxidation of the parts which the sulphur dioxide might attack or combine with.

The third method is identical with the second method so far as the drying and washing are concerned and differs in this respect that, after the period of washing, the system should be filled or remain filled with carbon dioxide at atmospheric pressure and then the sulphur dioxide be introduced as in the second method outlined. Charging the system with carbon dioxide at atmospheric pressure is merely for the purpose of insuring the attainment of the desired result and prevent any possibility whatsoever of oxidation taking place due to the presence of excess moisture or air or other cause.

Subsequent to charging by either of the methods stated, the system may be operated in the usual manner and at low pressure and the character of the refrigerating apparatus, that is—the type of pump or other apparatus used in conjunction therewith is not material to this invention as the refrigerant and method of utilizing the refrigerant herein outlined may be used with any known type and character of apparatus. With the system thus first thoroughly washed as described and filled with carbon dioxide at atmospheric pressure and the desired volume of sulphur dioxide introduced, no oxidation may take place within the system and all parts of the system as, for instance the pump and the valves, will remain clean and bright and the necessity of frequently disassembling the device for cleaning is entirely eliminated.

Having thus briefly described my invention, what I claim is—

1. The method of preventing deleterious effects from use of sulphur dioxide in the circulating system of artificial refrigerating plants consisting in first washing the system with carbon dioxide to cleanse the same, and then charging the system with sulphur dioxide.

2. The method of preventing oxidation in the circulation system of artificial refrigerating plants consisting of the use, with a major volume of sulphur dioxide, of a non-oxidizing agent introduced into the system previous to the introduction of the sulphur dioxide.

3. The method of preventing oxidation in the circulating system of artificial refrigerating plants consisting in first washing the circulating system with carbon dioxide to cleanse the same, leaving the system filled with carbon dioxide at about atmospheric pressure at the completion of the washing step, and then finally charging the system with the desired volume of sulphur dioxide.

4. The method of preventing deleterious effects resulting from the use of sulphur dioxide in the circulating system of artificial refrigerating plants which consists in thoroughly washing the system with carbon dioxide previous to charging the system with sulphur dioxide.

5. The method of preventing deleterious effects such as an accumulation of rust and production of sulphuric acid resulting from the use of sulphur dioxide in the circulating system of artificial refrigerating plants which consists in first thoroughly drying the circulating system, then washing the same thoroughly by passing carbon dioxide therethrough and finally introducing the desired volume of sulphur dioxide.

6. The method of preventing deleterious effects, such as an accumulation of rust and production of sulphuric acid, resulting from the use of sulphur dioxide in the circulating system of artificial refrigerating plants which consists in first thoroughly drying the circulating system, washing the same by passing carbon dioxide therethrough, then charging the system with carbon dioxide to about atmospheric pressure, and finally introducing the desired volume of sulphur dioxide.

7. The method of preventing oxidation and other deleterious effects resulting from the use of sulphur dioxide in the circulating system of artificial refrigerating plants consisting in cleansing the circulating system by charging the same with carbon dioxide under pressure, then exhausting the same and repeating the charging and exhausting for a number of times, and finally charging with sulphur dioxide at the desired pressure.

8. The method of preventing oxidation and other deleterious effects resulting from the use of sulphur dioxide in the circulating system of artificial refrigerating plants which consists in first drying the circulating system, then cleansing the same by charging with carbon dioxide under pressure of about fifty pounds per square inch, then exhausting the system, and repeating the charging and exhausting for a number of times leaving the system filled with carbon dioxide at about atmospheric pressure at the completion of the washing step, and then finally charging the system with the desired volume of sulphur dioxide.

In testimony whereof, I sign this specification.

FLOYD W. ROBISON.